(12) United States Patent
Xiong et al.

(10) Patent No.: US 11,870,667 B2
(45) Date of Patent: Jan. 9, 2024

(54) DELAY STATISTICAL METHOD, APPARATUS, STORAGE MEDIUM, AND SYSTEM

(71) Applicant: Huawei Technologies Co., Ltd., Shenzhen (CN)

(72) Inventors: Dianfei Xiong, Dongguan (CN); Chuan Gao, Dongguan (CN); Jinming Huang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/671,863

(22) Filed: Feb. 15, 2022

(65) Prior Publication Data

US 2022/0173991 A1    Jun. 2, 2022

Related U.S. Application Data

(63) Continuation of application No. PCT/CN2020/108608, filed on Aug. 12, 2020.

(30) Foreign Application Priority Data

Aug. 16, 2019  (CN) .......................... 201910760884.3

(51) Int. Cl.
*H04L 43/062* (2022.01)
*H04L 43/0864* (2022.01)
*H04L 43/067* (2022.01)
*H04L 43/0894* (2022.01)

(52) U.S. Cl.
CPC .......... *H04L 43/067* (2013.01); *H04L 43/062* (2013.01); *H04L 43/0864* (2013.01); *H04L 43/0894* (2013.01)

(58) Field of Classification Search
None
See application file for complete search history.

(56) References Cited

U.S. PATENT DOCUMENTS 7,457,868 B1 * 11/2008 Guo ...................... H04L 41/046
709/224
2001/0034788 A1   10/2001 Mcternan et al.
(Continued)

FOREIGN PATENT DOCUMENTS

CN         1933429 A      3/2007
CN         1984057 A      6/2007
(Continued)

OTHER PUBLICATIONS

Song H, "In-situ Flow Information Telemetry Framework," draftsong-opsawg-ifit-framework-03.txt, Jul. 9, 2019, XP015134210, 10 pages.
(Continued)

*Primary Examiner* — Joshua Joo
(74) *Attorney, Agent, or Firm* — HUAWEI TECHNOLOGIES CO., LTD.

(57) ABSTRACT

The disclosure provides a delay statistical method and apparatus thereof. In the delay statistical method, a first packet and a second packet that belong to a measurement period are obtained, where the first packet includes a first in-situ flow information measurement (iFIT) header with first flow detection information, and the second packet includes a second iFIT header with second flow detection information; a first delay parameter is obtained based on the first flow detection information and sent to a statistical apparatus; and a second delay parameter is obtained based on the second flow detection information and sent.

15 Claims, 11 Drawing Sheets

(56) References Cited

U.S. PATENT DOCUMENTS

| | | | |
|---|---|---|---|
| 2015/0195169 A1* | 7/2015 | Liu | H04L 43/0835 370/241.1 |
| 2015/0207712 A1* | 7/2015 | Fang | H04L 43/0852 370/252 |
| 2017/0244623 A1* | 8/2017 | Cociglio | H04L 43/0852 |
| 2018/0302179 A1 | 10/2018 | Leibfritz et al. | |
| 2019/0159076 A1* | 5/2019 | Kim | H04W 48/08 |
| 2020/0084147 A1* | 3/2020 | Gandhi | H04L 41/40 |
| 2020/0099611 A1* | 3/2020 | Filsfils | H04L 43/10 |
| 2020/0127906 A1* | 4/2020 | Malboubi | H04L 43/0852 |
| 2020/0244520 A1* | 7/2020 | Song | H04L 41/08 |

FOREIGN PATENT DOCUMENTS

| | | |
|---|---|---|
| CN | 101047451 A | 10/2007 |
| CN | 102394796 A | 3/2012 |
| CN | 103109501 A | 5/2013 |
| CN | 106936661 A | 7/2017 |
| JP | 2011135482 A | 7/2011 |
| WO | 2015090364 A1 | 6/2015 |

OTHER PUBLICATIONS

NTT DOCOMO, et al., "Implementation of cluster delay spread," 3GPP TSG RAN WG1 Meeting #84bis, Busan, Korea, R1-162994, Apr. 11-15, 2016, 4 pages.

RFC 7799, A. Morton et al., "Active and Passive Metrics and Methods (with Hybrid Types In-Between)," May 2016, 14 pages.

RFC 8321, G. Fioccola, Ed. et al., "Alternate-Marking Method for Passive and Hybrid Performance Monitoring," Jan. 2018, 33 pages.

RFC 3032, E. Rosen et al, "MPLS Label Stack Encoding," Jan. 2001, 23 pages.

* cited by examiner

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| FII | Flow instruction indicator label (0xC) | | | | | | | | | | | | | | | | | | | | TC | | | S | TTL | | | | | | | |
| FIH | Flow ID | | | | | | | | | | | | | | | | | | | | L | D | R | R/S | Header type (Header Type)=0x3/0x4 | | | | | | | |
| FIEH | Flow ID Ext | | | | | | | | | | | | | | | | | | | | Reserved | | | | | | | | | | | |
| Payload | MPLS payload (Payload) | | | | | | | | | | | | | | | | | | | | | | | | | | | | | | | |

FIG. 4

DELAY STATISTICAL METHOD, APPARATUS, STORAGE MEDIUM, AND SYSTEM

CROSS-REFERENCE TO RELATED APPLICATIONS

This is a continuation of International Patent Application No. PCT/CN2020/108608 filed on Aug. 12, 2020, which claims priority to Chinese Patent Application No. 201910760884.3 filed on Aug. 16, 2019. The disclosures of the aforementioned applications are hereby incorporated by reference in their entireties.

TECHNICAL FIELD

This application relates to the field of communication technologies, and in particular, to a delay statistical method, an apparatus, a storage medium, and a system.

BACKGROUND

As a mobile network gradually evolves from Long-Term Evolution (LTE) to a fifth generation (5G) mobile communication system, a network service poses a higher requirement on a delay. How to implement high-precision delay statistical in a packet transmission process becomes an urgent problem to be resolved currently.

SUMMARY

Embodiments of this application provide a delay statistical method, an apparatus, a storage medium, and a system, to resolve a problem in a related technology. Technical solutions are as follows.

According to a first aspect, a delay statistical method is provided, where the method includes obtaining a first packet and a second packet, where the first packet and the second packet belong to a same measurement period, the first packet includes first flow detection information, the first flow detection information includes a delay measurement flag, a first flag, and a second flag, the first flag of the first flow detection information is used to indicate a first sequence number of the first packet in the measurement period, and the second flag of the first flow detection information is used to indicate a total quantity of packets having delay measurement flags in the measurement period, the second packet includes second flow detection information, the second flow detection information includes a delay measurement flag, a first flag, and a second flag, the first flag of the second flow detection information is used to indicate a second sequence number of the second packet in the measurement period, and the second flag of the second flow detection information is used to indicate a total quantity of packets having delay measurement flags in the measurement period, obtaining a first delay parameter of the first packet based on the first flow detection information, obtaining a second delay parameter of the second packet based on the second flow detection information, and sending the first delay parameter and the second delay parameter to a statistical apparatus.

Delay statistical is performed on a plurality of packets having delay measurement flags in a measurement period, so that accuracy of a delay statistical result can be improved. In addition, because there are a plurality of packets having delay measurement flags, even if some packets having delay measurement flags are lost, delay data can still be collected subsequently, thereby improving reliability of delay statistical.

In an example embodiment, the first flow detection information is located in an in-situ flow information measurement (iFIT) header of the first packet. The iFIT header of the first packet includes a flow instruction indicator (FII), a flow instruction header (FIH), and a flow instruction extension header (FIEH). A reserved field of the FIEH is used to carry the first flag and the second flag of the first flow detection information. The second flow detection information is located in an iFIT header of the second packet. The iFIT header of the second packet includes an FII, an FIH, and an FIEH. A reserved field of the FIEH is used to carry the first flag and the second flag of the second flow detection information.

The first flag and the second flag are carried in the existing reserved field of the FIEH, so that the method provided in this embodiment of this application can be implemented without changing a protocol framework, and applicability is stronger.

In an example embodiment, the first packet and the second packet are discontinuous packets in different time periods in the same measurement period. In this mode, delay-colored packets are discontinuously distributed in a measurement period to prevent a packet loss from affecting accuracy of delay statistical.

In an example embodiment, the first delay parameter includes timestamp information of the first packet, and the second delay parameter includes timestamp information of the second packet.

In an example embodiment, the method further includes sending, to the statistical apparatus, a flow identifier of a service flow in which the first packet is located and information about an interface for transmission of the first packet, and sending, to the statistical apparatus, a flow identifier of a service flow in which the second packet is located and information about an interface for transmission of the second packet.

In an example embodiment, the sending the first delay parameter and the second delay parameter to a statistical apparatus includes sending, to the statistical apparatus, a delay parameter of a packet that belongs to the measurement period, has a delay measurement flag and is among packets obtained in the measurement period, where the packet that belongs to the measurement period and has the delay measurement flag includes the first packet and the second packet.

In an example embodiment, the sending the first delay parameter and the second delay parameter to a statistical apparatus includes sending, to the statistical apparatus, a delay parameter of a packet that belongs to the measurement period, has a delay measurement flag and is among packets obtained in the measurement period and packets obtained within reference time after end of the measurement period, where the packet that belongs to the measurement period and has the delay measurement flag includes the first packet and the second packet.

The reference time after the end of the measurement period is used as extended measurement time. In addition to a packet that belongs to the measurement period, has the delay measurement flag and is among the packets obtained in the measurement period, a packet is used as a report object, the packet belongs to the measurement period, has the delay measurement flag and is among the packets obtained within the reference time after the end of the measurement period. In this way, a more complete quantity of delay parameters of packets having delay measurement flags in the measurement period are reported to the statistical apparatus, thereby improving accuracy and reliability of measurement.

In an example embodiment, the first flow detection information of the first packet further includes a third flag, used to indicate the measurement period in which the first packet is located. The second flow detection information of the second packet further includes a third flag, used to indicate the measurement period in which the second packet is located. Therefore, packets in different measurement periods may be distinguished by using the third flag, so that reported delay parameters in a same measurement period are more accurate, to further ensure accuracy of delay statistical.

In an example embodiment, the method further includes sending, to the statistical apparatus, a quantity of packets transmitted in the measurement period and a quantity of bytes of each packet, and the quantity of packets and the quantity of bytes of each packet are used by the statistical apparatus to collect lost packet data. Based on delay statistics, the method provided in this embodiment of this application is compatible with packet loss measurement, and has good scalability.

According to a second aspect, a delay statistical method is provided, where the method includes receiving a first delay parameter of a first packet and a second delay parameter of a second packet, where the first packet and the second packet belong to a same measurement period, the first packet includes first flow detection information, the first flow detection information includes a delay measurement flag, a first flag, and a second flag, the first flag of the first flow detection information is used to indicate a first sequence number of the first packet in the measurement period, and the second flag of the first flow detection information is used to indicate a total quantity of packets having delay measurement flags in the measurement period, the second packet includes second flow detection information, the second flow detection information includes a delay measurement flag, a first flag, and a second flag, the first flag of the second flow detection information is used to indicate a second sequence number of the second packet in the measurement period, and the second flag of the second flow detection information is used to indicate a total quantity of packets having delay measurement flags in the measurement period, and performing delay statistics based on the first delay parameter and the second delay parameter.

Delay statistical is performed by using delay parameters of packets having delay measurement flags, so that calculated delay data is more accurate.

In an example embodiment, the first delay parameter includes timestamp information of the first packet, and the second delay parameter includes timestamp information of the second packet.

In an example embodiment, the method further includes receiving a flow identifier of a service flow in which the first packet is located and information about an interface for transmission of the first packet, and receiving a flow identifier of a service flow in which the second packet is located and information about an interface for transmission of the second packet.

In an example embodiment, performing delay statistics based on the first delay parameter and the second delay parameter includes performing delay statistics of the first packet in a target direction based on the first delay parameter, and performing delay statistics of the second packet in the target direction based on the second delay parameter, and averaging the delay data of the first packet in the target direction and the delay data of the second packet in the target direction, and using an average result as delay data of the service flow in the target direction.

In an example embodiment, the method further includes receiving a quantity of packets transmitted in the measurement period and a quantity of bytes of each packet, and collecting packet loss data based on the quantity of packets transmitted in the measurement period and the quantity of bytes of each packet.

According to a third aspect, a delay statistical apparatus is provided, where the apparatus includes a receiving module configured to obtain a first packet and a second packet, where the first packet and the second packet belong to a same measurement period, the first packet includes first flow detection information, the second packet includes second flow detection information, the first flow detection information includes a delay measurement flag, a first flag, and a second flag, the first flag of the first flow detection information is used to indicate a first sequence number of the first packet in the measurement period, and the second flag of the first flow detection information is used to indicate a total quantity of packets having delay measurement flags in the measurement period, the second flow detection information includes a delay measurement flag, a first flag, and a second flag, the first flag of the second flow detection information is used to indicate a second sequence number of the second packet in the measurement period, and the second flag of the second flow detection information is used to indicate a total quantity of packets having delay measurement flags in the measurement period, a processing module configured to obtain a first delay parameter of the first packet based on the first flow detection information, and obtain a second delay parameter of the second packet based on the second flow detection information, and a sending module configured to send the first delay parameter and the second delay parameter to a statistical apparatus.

In an example embodiment, the first flow detection information is located in an iFIT header of the first packet. The iFIT header of the first packet includes an FII, an FIH, and an FIEH. A reserved field of the FIEH is used to carry the first flag and the second flag of the first flow detection information. The second flow detection information is located in an iFIT header of the second packet. The iFIT header of the second packet includes an FII, an FIH, and an FIEH. A reserved field of the FIEH is used to carry the first flag and the second flag of the second flow detection information.

In an example embodiment, the first packet and the second packet are discontinuous packets in different time periods in the same measurement period.

In an example embodiment, the first delay parameter includes timestamp information of the first packet, and the second delay parameter includes timestamp information of the second packet.

In an example embodiment, the sending module is further configured to send, to the statistical apparatus, a flow identifier of a service flow in which the first packet is located and information about an interface for transmission of the first packet, and send, to the statistical apparatus, a flow identifier of a service flow in which the second packet is located and information about an interface for transmission of the second packet.

In an example embodiment, the sending module is configured to send, to the statistical apparatus, a delay parameter of a packet that belongs to the measurement period, has a delay measurement flag and is among packets obtained in the measurement period, where the packet that belongs to the measurement period and has the delay measurement flag includes the first packet and the second packet.

In an example embodiment, the sending module is configured to send, to the statistical apparatus, a delay parameter of a packet that belongs to the measurement period, has a delay measurement flag and is among packets obtained in the measurement period and packets obtained within reference time after end of the measurement period, where the packet that belongs to the measurement period and has the delay measurement flag includes the first packet and the second packet.

In an example embodiment, the first flow detection information of the first packet further includes a third flag, used to indicate the measurement period in which the first packet is located. The second flow detection information of the second packet further includes a third flag, used to indicate the measurement period in which the second packet is located.

According to a fourth aspect, a delay statistical apparatus is provided, where the apparatus includes a receiving module configured to receive a first delay parameter of a first packet and a second delay parameter of a second packet, where the first packet and the second packet belong to a same measurement period, the first packet includes first flow detection information, the second packet includes second flow detection information, the first flow detection information includes a delay measurement flag, a first flag, and a second flag, the first flag of the first flow detection information is used to indicate a first sequence number of the first packet in the measurement period, and the second flag of the first flow detection information is used to indicate a total quantity of packets having delay measurement flags in the measurement period, the second flow detection information includes a delay measurement flag, a first flag, and a second flag, the first flag of the second flow detection information is used to indicate a second sequence number of the second packet in the measurement period, and the second flag of the second flow detection information is used to indicate a total quantity of packets having delay measurement flags in the measurement period, and a processing module configured to obtain a first delay parameter of the first packet based on the first flow detection information, and obtain a second delay parameter of the second packet based on the second flow detection information, and a sending module configured to perform delay statistics based on the first delay parameter and the second delay parameter.

In an example embodiment, the first delay parameter includes timestamp information of the first packet, and the second delay parameter includes timestamp information of the second packet.

In an example embodiment, the receiving module is further configured to receive a flow identifier of a service flow in which the first packet is located and information about an interface for transmission of the first packet, and receive a flow identifier of a service flow in which the second packet is located and information about an interface for transmission of the second packet.

In an example embodiment, the processing module is configured to perform delay statistics of the first packet in a target direction based on the first delay parameter, perform delay statistics of the second packet in the target direction based on the second delay parameter, average the delay data of the first packet in the target direction and the delay data of the second packet in the target direction, and use an average result as delay data of the service flow in the target direction.

According to a fifth aspect, a delay statistical apparatus is provided, where the apparatus includes a communication interface and a processor. The communication interface is configured to obtain a first packet and a second packet. The first packet and the second packet belong to a same measurement period, the first packet includes first flow detection information, the first flow detection information includes a delay measurement flag, a first flag, and a second flag, the first flag of the first flow detection information is used to indicate a first sequence number of the first packet in the measurement period, and the second flag of the first flow detection information is used to indicate a total quantity of packets having delay measurement flags in the measurement period. The second packet includes second flow detection information, the second flow detection information includes a delay measurement flag, a first flag, and a second flag, the first flag of the second flow detection information is used to indicate a second sequence number of the second packet in the measurement period, and the second flag of the second flow detection information is used to indicate a total quantity of packets having delay measurement flags in the measurement period. The processor is configured to obtain a first delay parameter of the first packet based on the first flow detection information, and obtain a second delay parameter of the second packet based on the second flow detection information. The communication interface is further configured to send the first delay parameter and the second delay parameter to a statistical apparatus.

In an example embodiment, the first flow detection information is located in an iFIT header of the first packet. The iFIT header of the first packet includes an FII, an FIH, and an FIEH. A reserved field of the FIEH is used to carry the first flag and the second flag of the first flow detection information. The second flow detection information is located in an iFIT header of the second packet. The iFIT header of the second packet includes an FII, an FIH, and an FIEH. A reserved field of the FIEH is used to carry the first flag and the second flag of the second flow detection information.

In an example embodiment, the first packet and the second packet are discontinuous packets in different time periods in the same measurement period.

In an example embodiment, the first delay parameter includes timestamp information of the first packet, and the second delay parameter includes timestamp information of the second packet.

In an example embodiment, the communication interface is further configured to send, to the statistical apparatus, a flow identifier of a service flow in which the first packet is located and information about an interface for transmission of the first packet, and send, to the statistical apparatus, a flow identifier of a service flow in which the second packet is located and information about an interface for transmission of the second packet.

In an example embodiment, the communication interface is configured to send, to the statistical apparatus, a delay parameter of a packet that belongs to the measurement period, has a delay measurement flag and is among packets obtained in the measurement period, where the packet that belongs to the measurement period and has the delay measurement flag includes the first packet and the second packet.

In an example embodiment, the communication interface is configured to report, to the statistical apparatus, a delay parameter of a packet that belongs to the measurement period, has a delay measurement flag and is among packets obtained in the measurement period and packets obtained within reference time after end of the measurement period, where the packet that belongs to the measurement period and has the delay measurement flag includes the first packet and the second packet.

In an example embodiment, the first flow detection information of the first packet further includes a third flag, used to indicate the measurement period in which the first packet is located. The second flow detection information of the second packet further includes a third flag, used to indicate the measurement period in which the second packet is located.

According to a sixth aspect, a delay statistical apparatus is provided, where the apparatus includes a communication interface and a processor. The communication interface is configured to receive a first delay parameter of a first packet and a second delay parameter of a second packet, where the first packet and the second packet belong to a same measurement period. The first packet includes first flow detection information, the first flow detection information includes a delay measurement flag, a first flag, and a second flag, the first flag of the first flow detection information is used to indicate a first sequence number of the first packet in the measurement period, and the second flag of the first flow detection information is used to indicate a total quantity of packets having delay measurement flags in the measurement period. The second packet includes second flow detection information, the second flow detection information includes a delay measurement flag, a first flag, and a second flag, the first flag of the second flow detection information is used to indicate a second sequence number of the second packet in the measurement period, and the second flag of the second flow detection information is used to indicate a total quantity of packets having delay measurement flags in the measurement period. The processor is configured to perform delay statistics based on the first delay parameter and the second delay parameter.

In an example embodiment, the first delay parameter includes timestamp information of the first packet, and the second delay parameter includes timestamp information of the second packet.

In an example embodiment, the communication interface is further configured to receive a flow identifier of a service flow in which the first packet is located and information about an interface for transmission of the first packet, and receive a flow identifier of a service flow in which the second packet is located and information about an interface for transmission of the second packet.

In an example embodiment, the processor is configured to perform delay statistics of the first packet in a target direction based on the first delay parameter, perform delay statistics of the second packet in the target direction based on the second delay parameter, average the delay data of the first packet in the target direction and the delay data of the second packet in the target direction, and use an average result as delay data of the service flow in the target direction.

According to a seventh aspect, a delay statistical system is provided. The system includes any delay statistical apparatus according to the third aspect and any delay statistical apparatus according to the fourth aspect.

According to an eighth aspect, a delay statistical system is provided. The system includes any delay statistical apparatus according to the fifth aspect and any delay statistical apparatus according to the sixth aspect.

A delay statistical apparatus is further provided. The apparatus includes a memory and a processor. The memory stores at least one instruction. The processor loads and executes the at least one instruction to implement any one of the foregoing delay statistical methods.

A computer-readable storage medium is further provided. The storage medium stores at least one instruction, and a processor loads and executes the instruction to implement any one of the foregoing delay statistical methods.

Another communication apparatus is provided. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive and send a signal. In addition, when the processor executes the instructions stored in the memory, the communication apparatus is enabled to perform the method in any one of the foregoing possible implementations.

In an example embodiment, there are one or more processors, and there are one or more memories.

In an example embodiment, the memory may be integrated with the processor, or the memory and the processor are separately disposed.

In a specific implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in the embodiments of this application.

A computer program (product) is provided. The computer program (product) includes computer program code. When the computer program code is run on a computer, the computer is enabled to perform the methods in the foregoing aspects.

A chip is provided. The chip includes a processor configured to invoke, from a memory, instructions stored in the memory and run the instructions, to enable the chip to perform the methods in the foregoing aspects.

Another chip is provided. The chip includes an input interface, an output interface, a processor, and a memory. The input interface, the output interface, the processor, and the memory are connected through an internal connection path. The chip is configured to perform the methods in the foregoing aspects.

A communication device is provided. The communication device includes the foregoing chip. The chip performs the methods in the foregoing aspects.

BRIEF DESCRIPTION OF DRAWINGS

FIG. 4 is a schematic diagram of a structure of flow detection information encapsulation according to an embodiment of this application;

DESCRIPTION OF EMBODIMENTS

Terms used in embodiments of this application are merely used to explain specific embodiments of this application, but are not intended to limit this application.

As a mobile network evolves from LTE to 5G, a wireless service poses higher requirements in terms of bandwidth, delay, and connection flexibility. A mobile bearer network such as a slicing packet network (SPN) is used as an example. Based on the operations and maintenance (O&M) requirements of a 5G mobile bearer and in combination with an advantage and a disadvantage of an existing performance detection technology, the SPN proposes an iFIT performance detection technology. The iFIT is an in-band flow passive detection technology. A basic principle of the iFIT is similar to that of Internet Protocol (IP) flow performance measurement (FPM). The iFIT uses a coloring mechanism of Request for Comments (RFC) 8321 alternate-marking method for passive and hybrid performance monitoring to measure performance. Based on RFC 8321, the iFIT detection technology is an in-band detection technology that performs feature marking (coloring) a service flow and measures a packet loss and a delay for a feature field.

Figure 1:
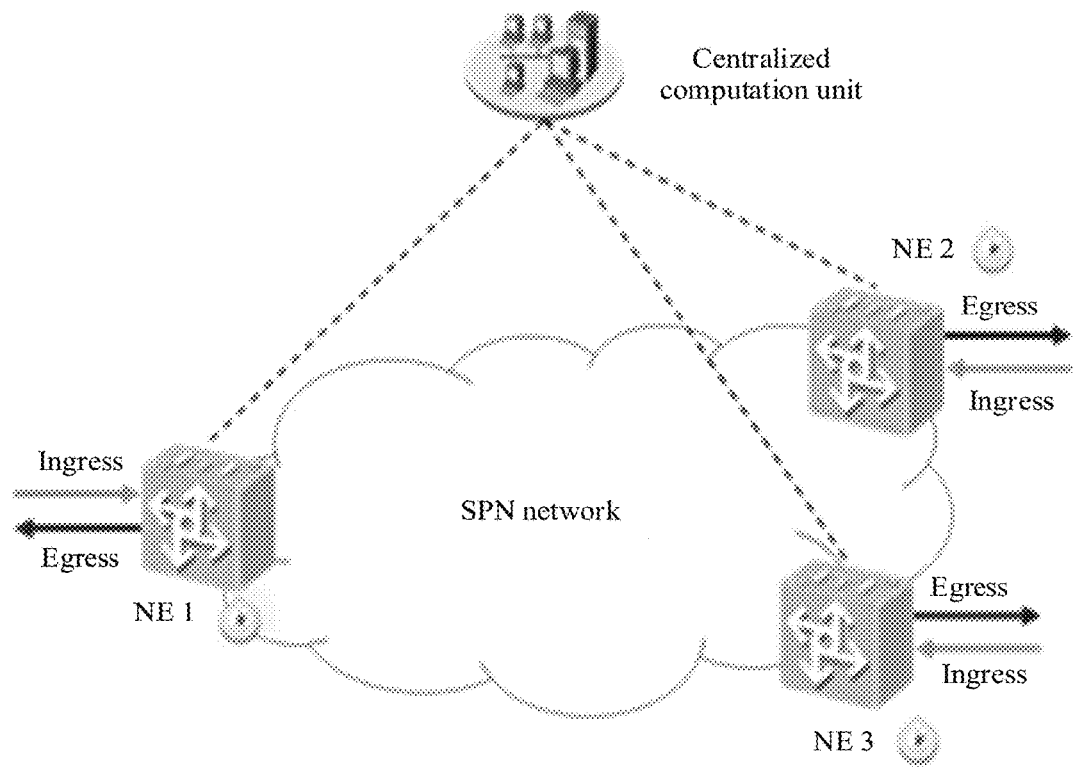
FIG. 1 is a schematic diagram of a structure of a network according to an embodiment of this application.

For example, in a network shown in FIG. 1, the iFIT detection technology is used to directly measure actual network traffic. The network includes a plurality of network elements (NEs), for example, an NE 1, an NE 2, and an NE 3. A service flow has several ingresses and egresses in the network. Using unicast as an example, a measurement result of the service flow in specific time includes:

Quantity of lost packets=Ingress Counter(NE 1+NE 2+NE 3)−Egress Counter(NE 1+NE 2+NE 3);

NE 1→NE 2 delay=Egress Timestamp (NE 2)−Ingress Timestamp (NE 1); and

NE 1→NE 3 delay=Egress Timestamp (NE 3)−Ingress Timestamp (NE 1).

Ingress Counter(NE 1+NE 2+NE 3) indicates a quantity of packets received by ingresses of the NE 1+the NE 2+the NE 3, and Egress Counter(NE 1+NE 2+NE 3) indicates a quantity of packets sent by egresses of the NE 1+the NE 2+the NE 3. Egress Timestamp (NE 2) indicates a timestamp of the egress of the NE 2, and Ingress Timestamp (NE 1) indicates a timestamp of the ingress of the NE 1. Egress Timestamp (NE 3) indicates a timestamp of the egress of the NE 3.

Figure 2:
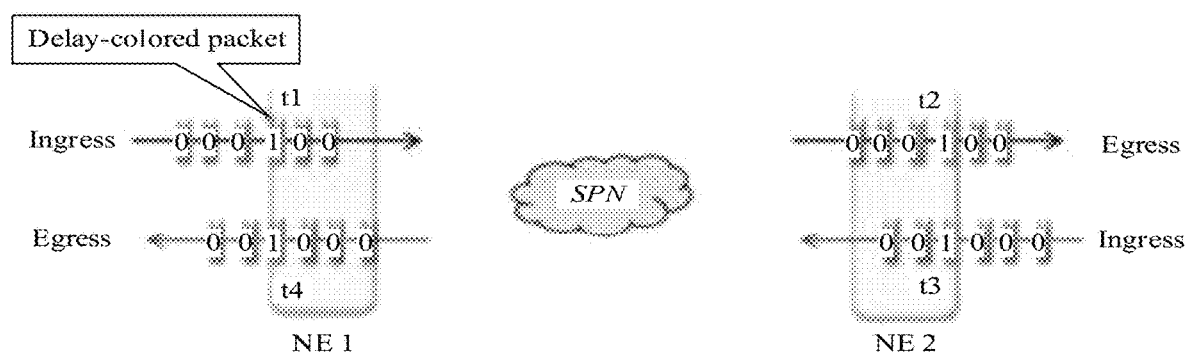
FIG. 2 is a schematic diagram of packet transmission according to an embodiment of this application.

Each packet on which feature marking (coloring) is performed has a delay measurement flag. An SPN network element measures a quantity of packets and records timestamps based on delay measurement flags of the packets, and then reports results to a centralized computation unit. The centralized computation unit calculates a packet loss and delay indicator of a service flow. According to a schematic diagram of packet transmission shown in FIG. 2, a principle of iFIT delay statistical is as follows.

Ingress end: In each measurement period, delay coloring is performed on one packet of a detected service flow in the measurement period, that is, there is one packet having a delay measurement flag in one measurement period. For example, for a packet sent from the NE 1 to the NE 2, an ingress timestamp of the packet is recorded as t1. For a packet sent from the NE 2 to the NE 1, an ingress timestamp of the packet is recorded as t3. The ingress timestamps are reported to a centralized computation unit.

Egress end: In the same measurement period of the ingress end, an egress timestamp of the delay-colored packet of the detected service flow in the measurement period is recorded. For example, for the packet sent from the NE 1 to the NE 2, an egress timestamp of the packet is t2. For the packet sent from the NE 2 to the NE 1, an egress timestamp of the packet is recorded as t4. The egress timestamps are reported to the centralized computation unit.

A measurement period Tj is used as an example. Tj represents any measurement period, where j is used as a label of the measurement period, and may be an integer starting from 0, for example, 0, 1, 2, or 3. If time of the NE 1 and the NE 2 is synchronized, the centralized computation unit calculates a one-way delay of the service flow in two directions in the measurement period Tj based on the reported information about the ingress end and the egress end:

One-way delay in a direction of NE 1→NE 2 Delay[Tj]=t2−t1; and

One-way delay in a direction of NE 2→NE 1 Delay[Tj]=t4−t3.

When the detected service flow is on the same path bidirectionally, the centralized computation unit may calculate a two-way delay of the service flow in the measurement period Tj based on reported the ingress information and the egress information:

NE 1←→NE 2 two-way delay Delay[Tj]=(t2−t1)+(t4−t3).

Figure 3:
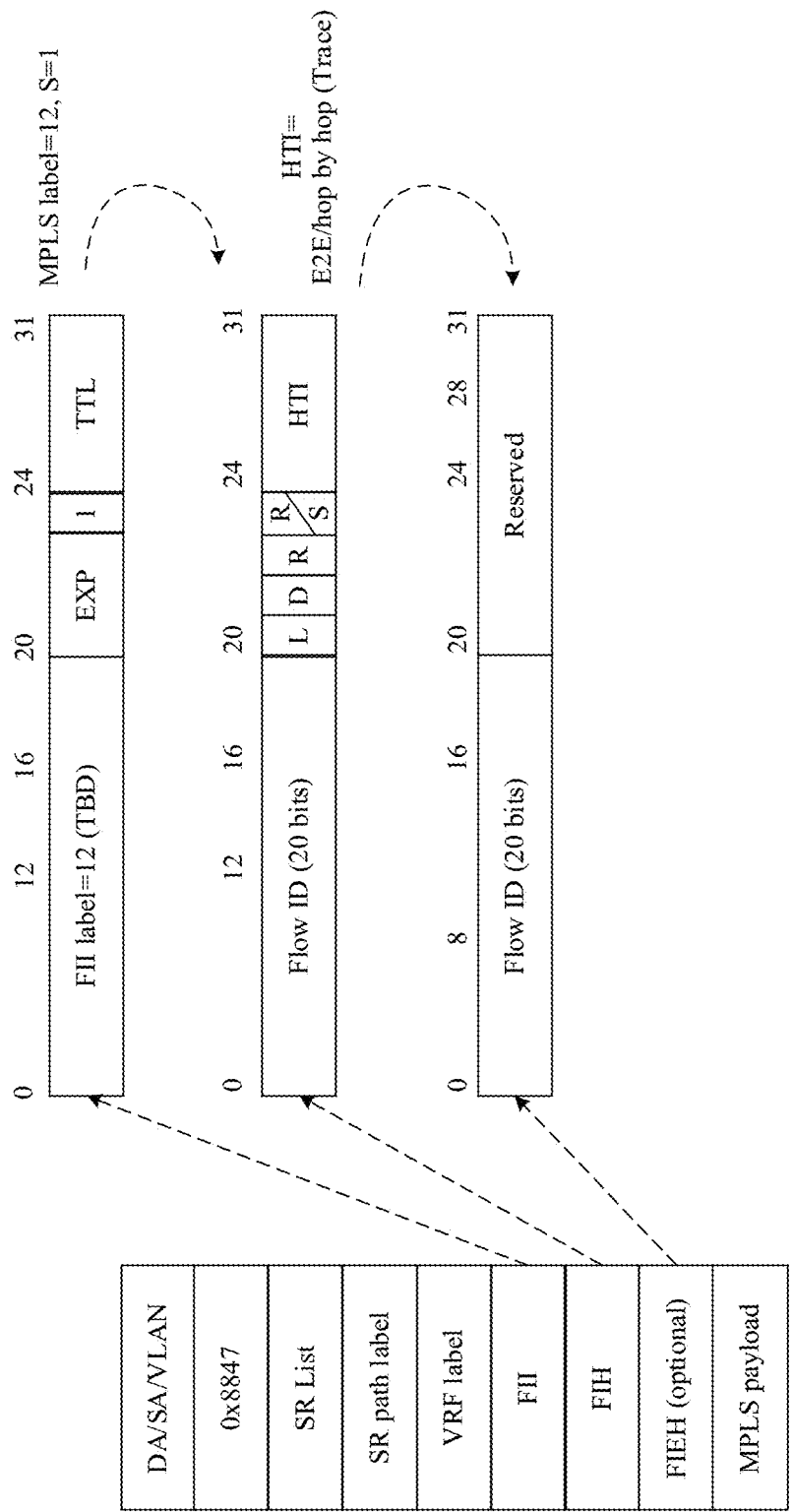
FIG. 3 is a schematic diagram of a structure of a packet according to an embodiment of this application.

A Multiprotocol Label Switching (MPLS) scenario is used as an example. A structure of an iFIT packet is shown in FIG. 3. In addition to an iFIT header, the iFIT packet further includes a destination address (DA), a source address (SA), a virtual local area network (VLAN), 0x8847 (type value), a segment routing (SR) list, an SR path label, a virtual routing forwarding (VRF) label and MPLS payload. A D flag in an FIH label of the iFIT header is a delay coloring flag. When a value of the D flag is 1, that is delay coloring, and this represents that the packet has a delay measurement flag. When the packet having the delay measurement flag passes through a port of a device, the device generates and records a timestamp of a current time based on current system time of the device. Then, data of the timestamp is sent to the centralized computation unit, and the centralized computation unit calculates a delay of a traffic path. The iFIT header includes three parts: an FII, an FIH, and an FIEH. An encapsulation format is shown in FIG. 4. The following describes a structure of an iFIT packet with reference to FIG. 3 and FIG. 4.

FII:

An iFIT header uses an FII label to perform guidance, and to indicate that after the FII label is FIH header content. The FII is an MPLS reserved label (0-15). The default value is "0xC". As shown in FIG. 3, FII Label=12. In addition, the label value is configurable. For maximum forward compatibility, the format of the label complies with RFC 3032. In addition to the flow instruction indication label, the FII further includes a traffic class (TC), a stack bottom S flag, and time to live (TTL).

FIH:

The FIH carries basic information used for iFIT in-band flow detection, including a flow identifier (Flow ID), a color bit (including L, D, R, R/S), and a header type indicator (HTI).

A Flow ID includes a bit 0 to a bit 19, is used to uniquely identify a service flow, and needs to be unique on an entire network in detection domain. An SPN network element identifies a flow based on the Flow ID.

L Flag, a packet loss flag, is used for packet loss measurement color marking. For example, if a value of the L flag is 1, it indicates that a packet loss needs to be measured, and if a value of the L flag is 0, it indicates that a packet loss does not need to be measured.

D Flag, a delay flag, is also called a delay coloring flag, and is used for delay statistical color marking. For example, if the D flag is 1, it indicates that delay needs to be measured. If the D flag in the FIH label of the iFIT header of a packet is 1, it indicates that the packet has a delay measurement flag. 0 indicates that delay statistical is not required. If the D flag in the FIH label of the iFIT header of a packet is 0, it indicates that the packet does not have a delay measurement flag.

R, a reserved flag, is reserved for future extension.

S/R: If the FII label is a stack bottom label, the flag is R and is set to 1 by default. If the FII label is not a stack bottom label, the flag is S.

HTI indicates an extended data type and indicates whether a FIH carries an extension header, where HTI=edge to edge (E2E)/hop by hop (trace).

0x00: reserved;

0x01: FIH is basic end-to-end detection information and does not carry an extension header;

0x02: FIH is basic hop-by-hop detection information and does not carry an extension header;

0x03: FIH is extended end-to-end detection information and carries an extension header, and FIEH is valid;

0x04: FIH is extended hop-by-hop detection information and carries an extension header, and FIEH is valid; and 0x05-0xFF: reserved for extended use.

When Header Type carries extension header 0x3/0x4, FIEH is valid. FIG. 4 shows the encapsulation format of FIEH.

FIEH:

The FIEH carries information used to support an iFIT extension capability. Currently, two types of an end-to-end extension header and a hop-by-hop extension header are defined. Extension fields include an extended flow ID (Flow ID ext) and a reserved field.

Flow ID Ext includes a bit 0 to a bit 19, is used to extend a width of the Flow ID, and forms a unique 40-bit flow identifier with a Flow ID of an FIH basic header. Extending a Flow ID enhances a flow ID allocation mode.

A load outside FII, FIH, and FIEH is a payload. The payload includes an MPLS payload.

Figure 5:
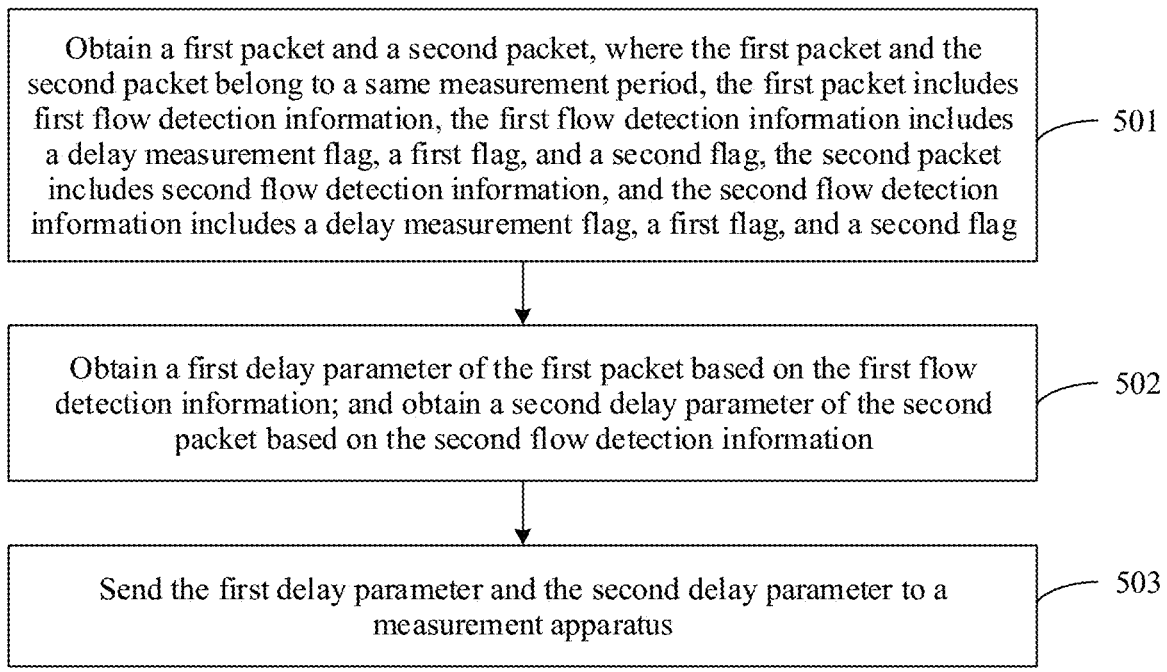
FIG. 5 is a flowchart of a delay statistical method according to an embodiment of this application.

Only one packet is selected for delay coloring in one measurement period. Consequently, a small quantity of samples is sampled, and accuracy of a delay value is not high. Especially when network performance fluctuates, a disadvantage of low accuracy is clearer. In addition, when a network path is congested, a single delay-colored packet in a measurement period is easily discarded, performance measurement in the corresponding measurement period does not include delay data. Therefore, an embodiment of this application provides a delay statistical method. In the method, delay statistical is performed based on a plurality of packets having delay measurement flags in a measurement period, to improve accuracy and reliability of delay statistical. Refer to FIG. 5. A delay statistical method provided in this embodiment of this application includes the following steps. The method may be performed by a network device, for example, a node device that transmits a packet in a network. For example, the method may alternatively be performed by a chip.

501: Obtain a first packet and a second packet, where the first packet and the second packet belong to a same measurement period. The first packet includes first flow detection information. The first flow detection information includes a delay measurement flag, a first flag, and a second flag. The second packet includes second flow detection information. The second flow detection information includes a delay measurement flag, a first flag, and a second flag.

According to the method provided in this embodiment of this application, delay coloring is performed on a plurality of packets in a same measurement period, that is, at least two packets in a same measurement period have delay measurement flags. In this embodiment, a first packet and a second packet among a plurality of packets having delay measurement flags are used as an example. Both the first packet and the second packet carry flow detection information. For example, in a first node device that transmits the packet, an iFIT label, that is, an iFIT header, is inserted into a packet whose transmission is performed. The iFIT header includes flow detection information, and the flow detection information carries a delay measurement flag. The first packet includes first flow detection information, and the second packet includes second flow detection information. For the first packet and the second packet in a measurement period, a value of a D flag in the iFIT header is set to 1, to indicate that delay statistical needs to be performed. The D flag that is set to 1 is the delay measurement flag. In addition, because a plurality of packets in one measurement period have delay measurement flags, in the method provided in this embodiment of this application, in addition to the delay measurement flag, the first flow detection information of the first packet further includes the first flag and the second flag. The first flag of the first flow detection information is used to indicate a sequence number of the first packet in the measurement period. The second flag of the first flow detection information is used to indicate a total quantity of packets having delay measurement flags in the measurement period. In addition to the delay measurement flag, the second flow detection information of the second packet further includes the first flag and the second flag. The first flag of the second flow detection information is used to indicate a sequence number of the second packet in the measurement period. The second flag of the second flow detection information is used to indicate a total quantity of packets having delay measurement flags in the measurement period.

Figure 6:
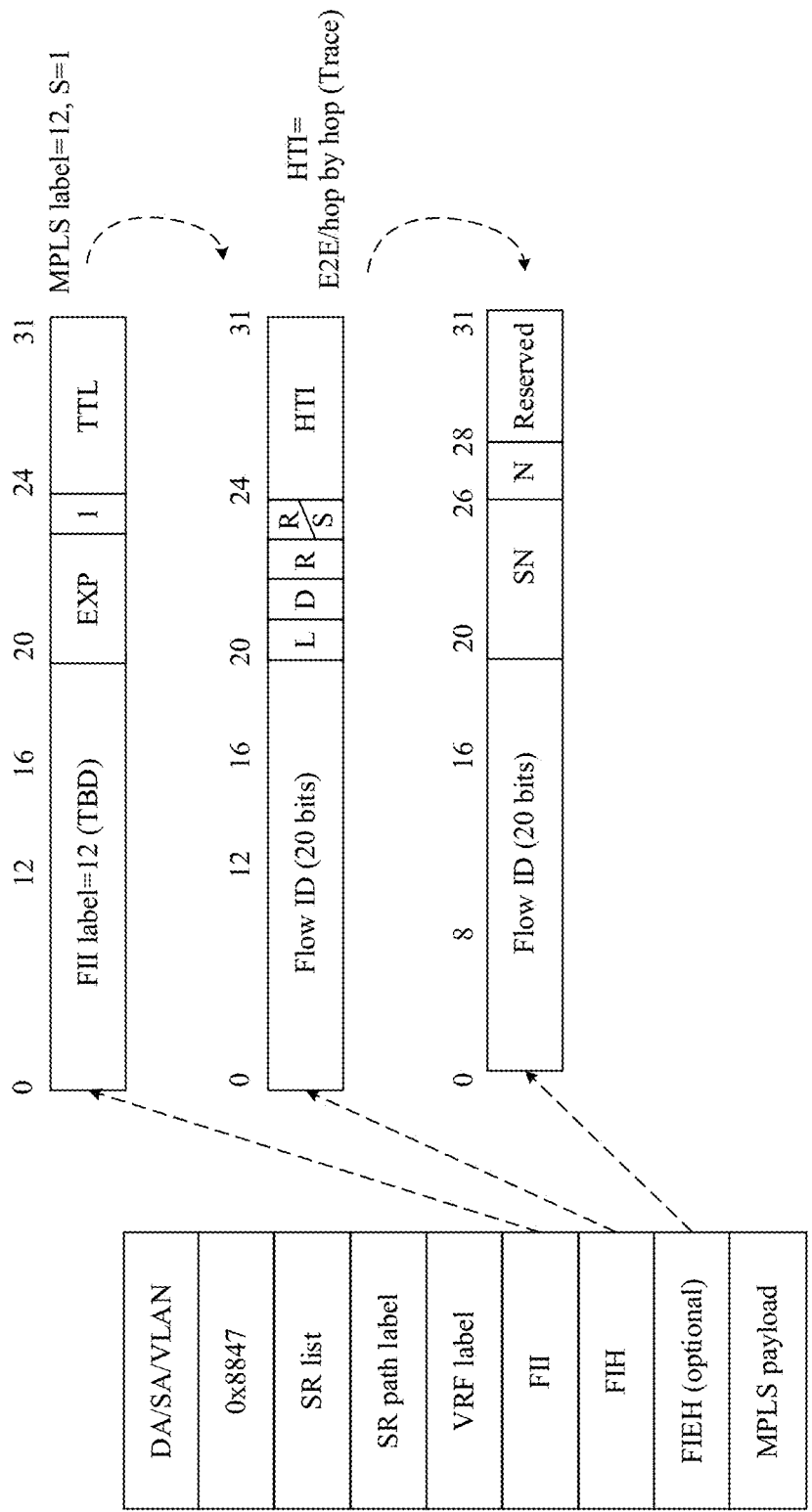
FIG. 6 is a schematic diagram of a structure of a packet according to an embodiment of this application.

In a specific embodiment, the first packet and the second packet are MPLS packets. A packet structure shown in FIG. 6 is used as an example. First flow detection information of a first packet is located in an iFIT header of the first packet, the iFIT header of the first packet includes an FII, an FIH, and an FIEH. A reserved field of the FIEH includes a first flag and a second flag. Second flow detection information of a second packet is located in an iFIT header of the second packet, the iFIT header of the second packet includes an FII, an FIH, and an FIEH. A reserved field of the FIEH includes a first flag and a second flag.

For content of the FII, the FIH, and the FIEH and meanings of the fields, refer to the foregoing descriptions of FIG. 3 and FIG. 4, and details are not described herein again. The reserved field of the FIEH in the structure shown in FIG. 3 is extended, so that the first packet and the second packet carry the first flag and the second flag. In this way, each node device that transmits a packet in the network may determine, based on the first flag and the second flag, a quantity of packets having delay measurement flags in the measurement period and a sequence number of the currently received packet having the delay measurement flag in the measurement period.

For example, by using a reserved field in an extension label FIEH of an iFIT, the $20^{th}$ bit to the $25^{th}$ bit are used as a sequence number flag SN, that is, the first flag, and are used to indicate a sequence number of the delay-colored packet in the measurement period. The $26^{th}$ and the $27^{th}$ bit are used as a flag N of a quantity of delay-colored packets in the measurement period, that is, the second flag, and are used to indicate the quantity of delay-colored packets in the measurement period. The delay-colored packet is a packet having a delay measurement flag, that is, a value of a D flag of the packet is 1. As shown in FIG. 6.

An N flag occupies two bits, and can define four types of quantities of colored packets supported in one measurement period. For example, a value of the N flag is defined as follows.

If a value of the N flag is 0, one packet is selected for delay coloring in one measurement period, that is, there is one packet having a delay measurement flag in one measurement period.

If a value of the N flag is 1, 10 packets are selected for delay coloring in one measurement period, that is, there are 10 packets having delay measurement flags in one measurement period.

If a value of the N flag is 2, 30 packets are selected for delay coloring in one measurement period, that is, there are 30 packets having delay measurement flags in one measurement period.

If a value of the N flag is 3, 60 packets are selected for delay coloring in one measurement period, that is, there are 60 packets having delay measurement flags in one measurement period.

After the value of the N flag is determined, in one measurement period, n delay-colored packets are marked with sequence numbers 1 to n in sequence. For example, when N is 3, a quantity n of delay-colored packets is 60. Sequence numbers of the 60 delay-colored packets range from 1 to 60.

The foregoing values of the N flags are merely examples for description. In addition, another value may be set. Alternatively, a different quantity of delay-colored packets is defined for each value. This is not limited in this embodiment of this application.

For a service flow that requires delay statistical, this embodiment of this application does not limit which packets in the service flow are added with delay measurement flags in a measurement period. A quantity of packets having delay measurement flags is not limited. To evenly distribute delay-colored packets in the measurement period, and to avoid a packet loss from affecting accuracy of delay statistical, according to the method provided in this embodiment of this application, a first node device may evenly select a plurality of packets in the measurement period to add delay measurement flags. For example, the measurement period is divided into a plurality of time periods, and one or more discontinuous packets are selected in each time period to add one or more delay measurement flags, that is, one or more packets are selected and one or more values of one or more D flags are set to 1. In this case, in an example embodiment, the first packet and the second packet are discontinuous packets in different time periods in the same measurement period. "Discontinuous" means that sequence numbers of packets are not adjacent. For example, the second flag in the first flow detection information of the first packet is used to indicate a first sequence number of the first packet in the measurement period, the second flag in the second flow detection information of the second packet is used to indicate a second sequence number of the second packet in the measurement period. "Discontinuous" means that the first sequence number and the second sequence number are discontinuous. That is, the first packet and the second packet are not adjacent packets in the measurement period.

Figure 7:
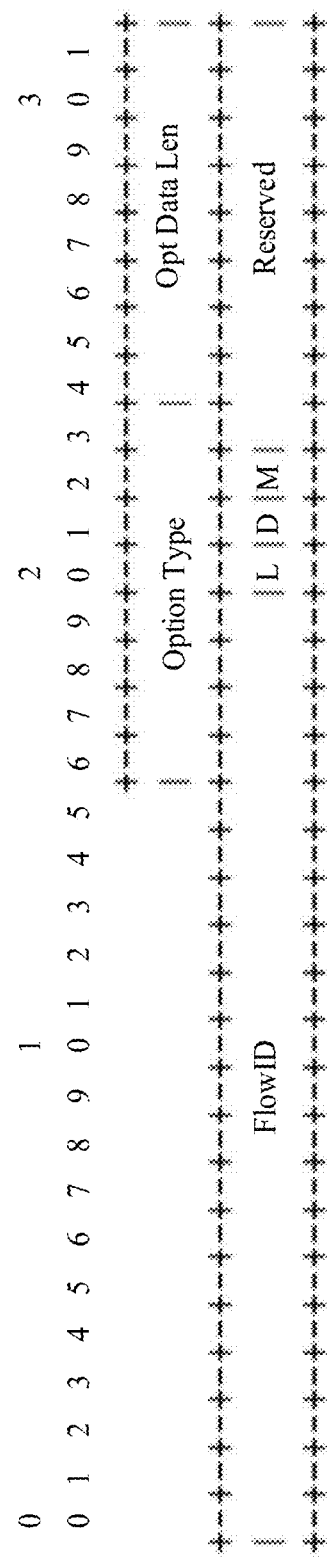
FIG. 7 is a schematic diagram of a structure of flow detection information encapsulation according to an embodiment of this application.

In another example implementation, the first packet and the second packet are IP version 6 (IPv6) packets. An iFIT IPv6 encapsulation format shown in FIG. 7 is used as an example. The iFIT includes:

Option type: An option type field includes an 8-bit option type identifier, and the field needs to be allocated.

Option data length (Opt Data Len): 8-bit unsigned integer. A length of the option data field of this option is in octets.

Flow ID: 20-bit unsigned integer. A flow identifier field is a field that uniquely identifies a monitored flow in measurement domain. The field is set at an ingress node. The flow ID can be uniformly assigned by a central controller or algorithmically generated by the ingress node. The latter method cannot ensure uniqueness of the flow ID, but a conflict probability is low due to large flow ID space. (20 bits unsigned integer. Flow ID field is to uniquely identify a monitored flow within the measurement domain. The field is set at the ingress node. The flow ID can be uniformly assigned by the central controller or algorithmically generated by the ingress node. The latter approach cannot guarantee the uniqueness of flow ID, yet the conflict probability is small due to the large flow ID space.)

L flag: Packet loss flag. For details, see [RFC8321].

D flag: Delay flag. For details, see [RFC8321].

M flag: A flag defined in a postcard based telemetry (PBT), as described in [I-D.song-ippm-postcard-based-telemetry].

Reserved field: reserved for further use. These flags need to be set to zero. It should be noted that PBT-I[I-D. Song-IPPM-Postcard-Based-Telemetry] can also be used. In this case, the flag field is included in a hop-by-hop option, as described in [I-D. Song-IPPM-Postcard-Based-Telemetry].

When the method provided in this embodiment of this application is applied, a value of the D flag in FIG. 7 is set to 1. A first flag is set in the reserved field shown in FIG. 7, to indicate a sequence number of a delay-colored packet in a current measurement period. A second flag is set in the reserved field shown in FIG. 7, to indicate a quantity of delay-colored packets in the current measurement period.

It should be noted that the foregoing uses only an example in which the first packet and the second packet are MPLS packets and IPv6 packets. In addition, the first packet and the second packet may alternatively be other packets, for example, IPv6 segment routing (SRv6) packets. For a structure of the SRv6 packet, refer to the foregoing IPv6 packet. Details are not described herein again in this embodiment of this application, and types of the first packet and the second packet are not limited.

502: Obtain a first delay parameter of the first packet based on the first flow detection information, and obtain a second delay parameter of the second packet based on the second flow detection information.

Because the first packet and the second packet belong to a same measurement period and have delay measurement flags, and the delay measurement flags are used to indicate to perform delay statistical, node devices that obtain the first packet and the second packet all record the delay parameters for the first packet and the second packet. For example, obtaining the first delay parameter of the first packet based on the first flow detection information includes obtaining the first delay parameter of the first packet based on the delay measurement flag in the first flow detection information. Obtaining the second delay parameter of the second packet based on the second flow detection information includes obtaining the second delay parameter of the second packet based on the delay measurement flag in the second flow detection information. For example, obtaining the first delay parameter of the first packet based on the first flow detection information includes obtaining the first delay parameter of the first packet based on the delay measurement flag and the second flag in the first flow detection information. Obtaining the second delay parameter of the second packet based on the second flow detection information may further include obtaining the second delay parameter of the second packet based on the delay measurement flag and the second flag in the second flow detection information.

Regardless of how the delay parameter is obtained, the delay parameter may be a delay from sending to receiving that is calculated based on a sending timestamp and a timestamp of receiving the packet that are carried in the packet, or based on the timestamp of receiving the packet and a sending timestamp of forwarding the packet to a next-hop network device. For example, the first delay parameter may be a delay from sending to receiving that is calculated based on a sending timestamp and a timestamp of receiving the first packet that are carried in the first packet, or based on the timestamp of receiving the first packet and a sending timestamp of forwarding the first packet to a next-hop network device. The second delay parameter may be a delay from sending to receiving that is calculated based on a sending timestamp and a timestamp of receiving the second packet that are carried in the second packet, or based on the timestamp of receiving the second packet and a sending timestamp of forwarding the second packet to a next-hop network device.

For example, the first delay parameter of the first packet includes timestamp information of the first packet, and the second delay parameter of the second packet includes a timestamp parameter of the second packet.

For example, the timestamp information of the first packet includes ingress timestamp information and egress timestamp information of the first packet. The ingress timestamp information records a time at which the first packet arrives at the ingress, and the egress timestamp information records a time at which the first packet leaves the egress. The timestamp information of the second packet includes ingress timestamp information and egress timestamp information of the second packet. The ingress timestamp information records a time at which the second packet arrives at the ingress, and the egress timestamp information records a time at which the second packet leaves the egress. Both the ingress and the egress are interfaces of the node device.

In an example embodiment, in addition to reporting the timestamp information of the first packet and the timestamp information of the second packet, the method provided in this embodiment of this application further includes sending, to a statistical apparatus, a flow identifier of a service flow in which the first packet is located and information about an interface for transmission of the first packet, and sending, to the statistical apparatus, a flow identifier of a service flow in which the second packet is located and information about an interface for transmission of the second packet.

For example, the flow identifier of the service flow in which the first packet is located is used to identify a service flow to which the first packet belongs. The information about the interface for transmission of the first packet includes but is not limited to an identifier of the interface for transmission of the first packet. To determine a direction of the interface in which the first packet is transmitted, the information about the interface for transmission of the first packet further includes direction information of the interface for transmission of the first packet. The direction information of the interface for transmission of the first packet is used to indicate whether a transmission direction of the first packet on the interface is an ingress direction or an egress direction. The flow identifier of the service flow in which the second packet is located is used to identify a service flow to which the second packet belongs. The information about the interface for transmission of the second packet includes but is not limited to an identifier of the interface for transmission of the second packet. To determine a direction of the interface in which the second packet is transmitted, the information about the interface for transmission of the second packet further includes direction information of the interface for transmission of the second packet. The direction information of the interface for transmission of the second packet is used to indicate whether a transmission direction of the second packet on the interface is an ingress direction or an egress direction, that is, whether the interface is an ingress or an egress.

In an example embodiment, the first flow detection information of the first packet further includes a third flag, used to indicate the measurement period in which the first packet is located. The second flow detection information of the second packet further includes a third flag, used to indicate the measurement period in which the second packet is located. For example, the third flag may be a period number, in this case, the first flow detection information of the first packet further includes a period number of the measurement period, and the second flow detection information of the second packet further includes the period number of the measurement period. The measurement period to which the first packet and the second packet belong can be determined based on the period numbers in the first packet and the second packet.

In addition to using the period number as the third flag to indicate the measurement period, other existing information in the iFIT header may be used as the third flag to indicate different measurement periods. For example, a packet loss flag L in the FIH in FIG. 3, FIG. 4, or FIG. 7 is used as the third flag, and a value of the L flag is inverted between 0 and 1, thereby identifying different measurement periods.

The third flag may be further implemented in another manner, to distinguish the measurement period. A manner of indicating the measurement period is not limited in this embodiment of this application. It should be noted that, in an example embodiment, when the value of the L flag is inverted to indicate the measurement period, no matter whether the value of the L flag is 0 or 1, the L flag can be used to indicate to perform packet loss measurement.

503: Send the first delay parameter and the second delay parameter to the statistical apparatus.

After recording the first delay parameter of the first packet and the second delay parameter of the second packet, each node device reports the recorded first delay parameter and the recorded second delay parameter to the statistical apparatus, so that the statistical apparatus collects delay data based on the recorded first delay parameter and the recorded second delay parameter. For example, the reporting the first delay parameter of the first packet and the second delay parameter of the second packet to the statistical apparatus includes but is not limited to the following two manners.

Manner 1: Report, to the statistical apparatus, a delay parameter of a packet that belongs to the measurement period, has a delay measurement flag and is among packets obtained in the measurement period, where the packet that belongs to the measurement period and has the delay measurement flag includes the first packet and the second packet.

In the manner 1, after end of the measurement period, regardless of whether a packet loss exists, the delay parameter of the packet that belongs to the measurement period, has the delay measurement flag and is among the packets obtained in the measurement period is reported to the statistical apparatus.

Manner 2: Report, to the statistical apparatus, a delay parameter of a packet that belongs to the measurement period, has a delay measurement flag and is among packets obtained in the measurement period and packets obtained within reference time after end of the measurement period, where the packet that belongs to the measurement period and has the delay measurement flag includes the first packet and the second packet.

In the manner 2, because a delay difference may be relatively large between a first node device and a last node device that transmit the packet, a receive end may prolong measurement time to tolerate a time difference between the first and last network element devices. The reference time after the end of the measurement period is used as extended measurement time. In addition to a packet that belongs to the measurement period, has the delay measurement flag and is among the packets obtained in the measurement period, a packet is used as a report object, the packet belongs to the measurement period, has the delay measurement flag and is among the packets obtained within the reference time after the end of the measurement period. In this way, delay parameters of a more complete quantity of packets having delay measurement flags in the measurement period are reported to the statistical apparatus, thereby improving accuracy and reliability of measurement. A length of the reference time after the end of the measurement period is not limited in this embodiment of this application. The length may be set based on experience, may be set based on an application scenario, or may be adjusted at any time based on network quality.

For example, in the foregoing manner 1 or manner 2, the first flow detection information of the first packet further includes the third flag, used to indicate the measurement period in which the first packet is located. The second flow detection information of the second packet further includes the third flag, used to indicate the measurement period in which the second packet is located. Therefore, packets of different measurement periods may be distinguished among obtained packets by using the third flag in the first flow detection information and the second flow detection information. For an implementation of the third flag, refer to the description in step 502. Details are not described herein again.

The foregoing merely uses delay statistical as an example. In addition to delay statistical, in an example embodiment, the method provided in this embodiment of this application further includes sending, to the statistical apparatus, a quantity of packets transmitted in the measurement period and a quantity of bytes of each packet. The quantity of packets and the quantity of bytes of each packet are used by the statistical apparatus to collect packet loss data.

Figure 8:
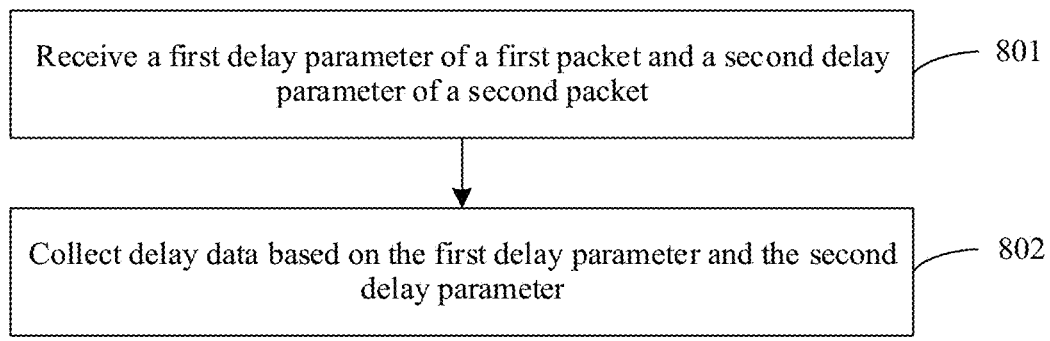
FIG. 8 is a flowchart of a delay statistical method according to an embodiment of this application.

The following uses a statistical apparatus side as an example to describe the delay statistical method. As shown in FIG. 8, the delay statistical method includes the following processes.

801: Receive a first delay parameter of a first packet and a second delay parameter of a second packet.

As described in the content shown in FIG. 5, the first packet and the second packet belong to a same measurement period and have delay measurement flags. First flow detection information of the first packet and second flow detection information of the second packet separately include a delay measurement flag, a first flag, and a second flag. The first flag of the first flow detection information is used to indicate a sequence number of the first packet in the measurement period. The second flag of the first flow detection information is used to indicate a total quantity of packets having delay measurement flags in the measurement period. The first flag of the second flow detection information is used to indicate a sequence number of the second packet in the measurement period. The second flag of the second flow detection information is used to indicate a total quantity of packets having delay measurement flags in the measurement period.

After receiving the first delay parameter of the first packet and the second delay parameter of the second packet, a statistical apparatus can perform delay statistics based on a measurement requirement. The first delay parameter of the first packet includes but is not limited to timestamp information of the first packet, and the second delay parameter of the second packet includes but is not limited to timestamp information of the second packet.

In an example embodiment, the method further includes receiving a flow identifier of a service flow in which the first packet is located and information about an interface for transmission of the first packet, and receiving a flow identifier of a service flow in which the second packet is located and information about an interface for transmission of the second packet.

For content of the timestamp information, the flow identifier, and the interface information, refer to the content description shown in FIG. 5. Details are not described herein again.

802: Collect the delay data based on the first delay parameter and the second delay parameter.

After receiving the first delay parameter and the second delay parameter, the statistical apparatus may collect the delay data based on the first delay parameter and the second delay parameter after end of the measurement period, or may collect the delay data in a period of time after the end of the measurement period. An occasion at which the statistical apparatus collects the delay data based on the first delay parameter and the second delay parameter is not limited in this embodiment of this application.

In addition to receiving the delay parameter including the timestamp information, the statistical apparatus may further receive content such as the flow identifier and the interface information, and there may be one or more node devices that report the information to the statistical apparatus. Therefore, the statistical apparatus may collect a plurality of types of delay based on the measurement requirement. For example, performing delay statistics based on the first delay parameter and the second delay parameter includes but is not limited to performing delay statistics of the first packet in a target direction based on the first delay parameter, and performing delay statistics of the second packet in the target direction based on the second delay parameter, and averaging the delay data of the first packet in the target direction and the delay data of the second packet in the target direction, and using an average result as delay data of the service flow in the target direction. The target direction may be a positive direction of packet transmission, may be a negative direction of packet transmission, or may be bidirectional. This is not limited in this embodiment of this application, and may be determined based on the measurement requirement. For example, the target direction is a direction in which the first packet and the second packet are transmitted from a node device 1 to a node device 2. In addition to a transmission direction between node devices, the target direction may also be a transmission direction inside a node device. For example, the target direction is a direction in which the first packet and the second packet are transmitted from an ingress to an egress of the node device 1.

Regardless of which direction the delay data is collected, when delay data in the same direction is collected based on the first delay parameter and the second delay parameter, the delay data of each packet may be separately calculated, and then the delay data of each packet is summed up. Then, a quotient is obtained between the summation result and a quantity of packets that participate in the delay statistical, that is, the delay data of each packet that participates in the delay statistical is averaged. For example, if the target direction is unidirectional, the calculated delay data is represented as:

$$\text{Delay data} = \Sigma(t'1(i) - t1(i))/L, i \in \{1, 2, 4 \ldots m\}$$

where i represents a packet sequence number, $t'1(i)$ represents timestamp information of the $i^{th}$ packet at a destination location in the target direction, and $t1(i)$ represents timestamp information of the $i^{th}$ packet at a start location in the target direction. For performing delay statistics between node devices, the destination location in the target direction is a first node device, and the start location in the target direction is a last node device. For performing delay statistics in a node device, the destination location in the target direction is an egress of the node device, and the start location in the target direction is an ingress of the node device.

$L$=size of $\{1, 2, 4 \ldots m\}$, that is, L indicates a quantity of received delay-colored (that is, having delay measurement flags) packets in the measurement period. It should be noted that, when the statistical apparatus collects delay data of a service flow on an entire transmission path, a packet participating in the delay statistical is a packet received by a destination node device. Packets that are not received by the destination node device do not participate in the delay statistical.

In an example embodiment, the statistical apparatus further receives a quantity of packets transmitted in the measurement period and a quantity of bytes of each packet. The statistical apparatus is further configured to collect packet loss data based on the quantity of packets transmitted in the measurement period and the quantity of bytes of each packet.

Figure 9:
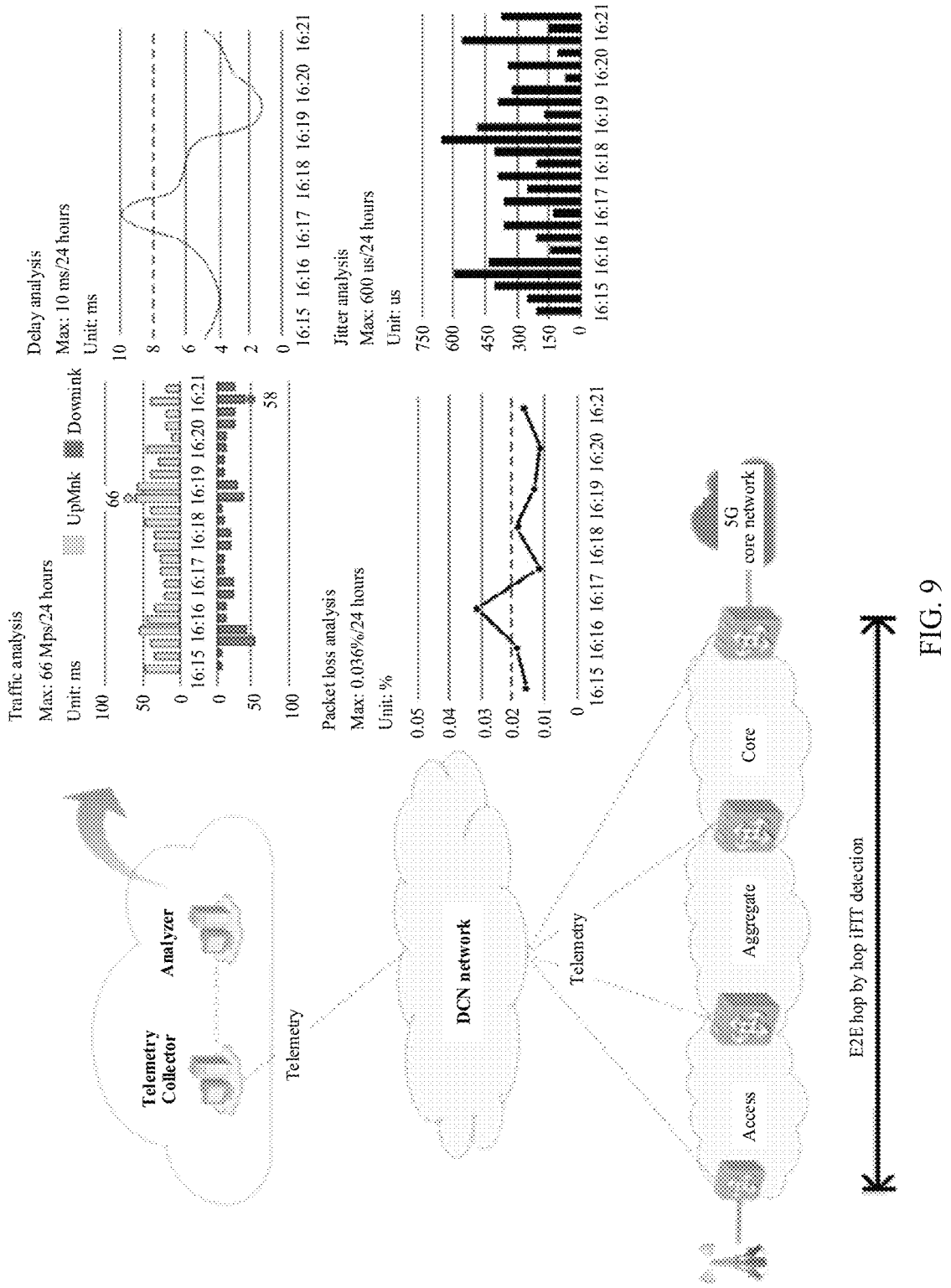
FIG. 9 is a schematic diagram of a structure of a network according to an embodiment of this application.

For example, the delay statistical method provided in this embodiment of this application is applied to the system architecture shown in FIG. 9. The system architecture shown in FIG. 9 includes a plurality of SPN devices in an access network, an aggregation network, and a core network. When iFIT is enabled on an SPN device to monitor network traffic, a first node device inserts an iFIT header into a packet of a service flow. The packet carrying the iFIT header pass through a port of each node device on a path. Each node device performs corresponding processing by identifying flow detection information in the iFIT header carried in the packet in the service flow. Then, the node device reports a collected delay parameter to a collector by using Telemetry. For example, the reported delay parameter includes but is not limited to a flow id (a flow identifier, used to identify a service flow to which the packet belongs), a physical interface (indicate that measurement parameters of the packet are collected on the interface), a period number (for example, reference time may be used as a period number for identification), a direction (measure a direction in which the packet is transmitted on the interface, egress direction or ingress direction), a quantity of packets, a quantity of packet bytes, and a timestamp.

The preceding measurement parameters are recorded for all the paths that the service flow traverses. A centralized computation unit summarizes and calculates the measurement parameters, generates a physical topology diagram through which the service flow passes, and obtains ingress time and egress time, end-to-end one-way delay, and hop-by-hop delay of each packet in the topology diagram. The collector uniformly sends performance data collected on the entire network, that is, the measurement parameters, to the analyzer for calculation, to obtain a real-time service-level agreement (SLA) performance indicator of user traffic. The SLA performance indicator includes performance indicators such as traffic receiving and sending, a packet loss, a delay, and delay jitter. For example, as shown in the SLA performance indicator obtained by measurement in the upper right corner of FIG. 9, traffic analysis, delay analysis, packet loss analysis, and jitter analysis may be performed based on the measurement parameters.

Figure 10:
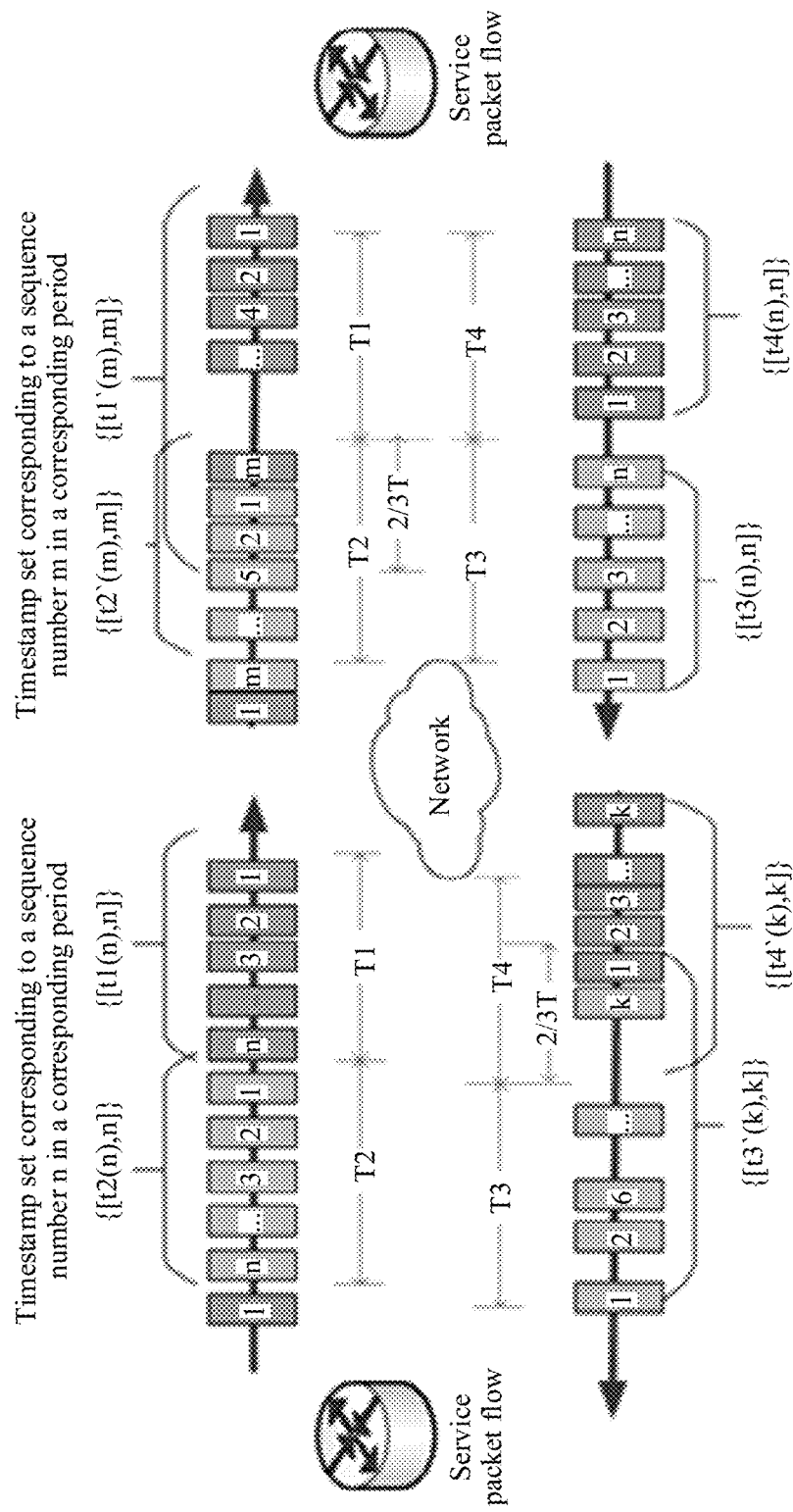
FIG. 10 is a schematic diagram of packet transmission according to an embodiment of this application.

In the system architecture shown in FIG. 9, the packet transmission process shown in FIG. 10 is used as an example to describe a delay statistical process. As shown in FIG. 10, time of each node device that transmits a packet is synchronized. A first node device is in a measurement period whose period number is T1. It is assumed that an L flag of an iFIT label is set to 0. The first node device performs delay coloring on a service packet by using a fixed interval (a D flag is 1), adds a corresponding timestamp sequence number Sn (that is, a sequence number of the packet in the measurement period), and records a timestamp value t(n). After end of the T1 measurement period, the first node device can collect delay parameters of delay-colored packets corresponding to n groups of different sequence numbers in the T1 measurement period, such as [t(1), S1], [t(2), S2], and [t(3), S3] . . . [t(n), Sn].

At the same time, 0/1 reversal is performed on the L flag. The L flag is inverted from 0 to 1, indicating to measure a packet for data of a next period number T2. After receiving the delay-colored packet, an intermediate node device or the last node device detects that the D flag is 1, and also records the sequence number and a current timestamp of the packet. Because a delay difference may be relatively large between a first node device and a last node device, a receive end needs to prolong measurement time to tolerate a time difference between the first and last network elements. For example, as shown in FIG. 7, when the prolonged measurement time is ⅔T time, the last node device collects delay measurement parameters, [t'(1), S1], [t'(2), S2], [t'(3), S3] . . . [t'(m), Sm], corresponding to m (m≤n) groups of different sequence numbers within receiving measurement time (T1+⅔T) of the T1 measurement period. Within this receiving time, packets whose L flags in iFIT labels are 0 and 1 are also received. In an iFIT label, that an L flag is 0 indicates a packet with a period number T1, and that an L flag is 1 indicates a packet of the next period T2. When a measurement parameter is recorded, a period number is also recorded, so that measurement parameters of adjacent periods can be distinguished. When network quality is good, transmitted packets are not lost, and m=n. When network quality is unstable, transmitted packets may be lost, and as a result, m<n.

For example, for the network shown in FIG. 9, a measurement parameter recorded by each node device is reported to the collector by using a telemetry protocol, and the collector sends a measurement parameter of a network-wide service traffic path to the centralized computation unit. Taking measurement of delay data as an example, the centralized computation unit calculates a network topology based on the received measurement parameter, and calculates a timestamp value of a packet that is corresponding to a sequence number and that is received by a destination end device. Because the destination end may not receive all sequence numbers 1-n, a packet corresponding to an unreceived sequence number is not included in the calculation. The calculation formula is as follows.

As shown in FIG. 10, for one-way delay data:

One-way delay data of forward traffic: $t1=\Sigma(t'1(i)-t1(i))/L$, $i \in \{1, 2, 4 \ldots m\}$, L=size of $\{1, 2, 4 \ldots m\}$, that is, L indicates a quantity of delay-colored packets in a receiving period.

One-way delay data of reverse traffic: $t3=\Sigma(t'3(i)-t3(i))/L$, $i \in \{1, 2, 6 \ldots k\}$, L=size of $\{1, 2, 6 \ldots k\}$, that is, L indicates a quantity of delay-colored packets in a receiving period.

In conclusion, based on the foregoing delay statistical process, the SPN device increases the quantity of the delay-colored packets in the measurement period, and selects a plurality of packets at a fixed interval in a measurement period for delay coloring and sequence number marking. Therefore, timestamps of the plurality of the delay-colored packets in average time periods in a single measurement period can be collected, thereby increasing a quantity of sampling samples. On a centralized computation unit side, accuracy and stability of delay statistical can be improved by correspondingly improving a calculation algorithm.

Figure 11:
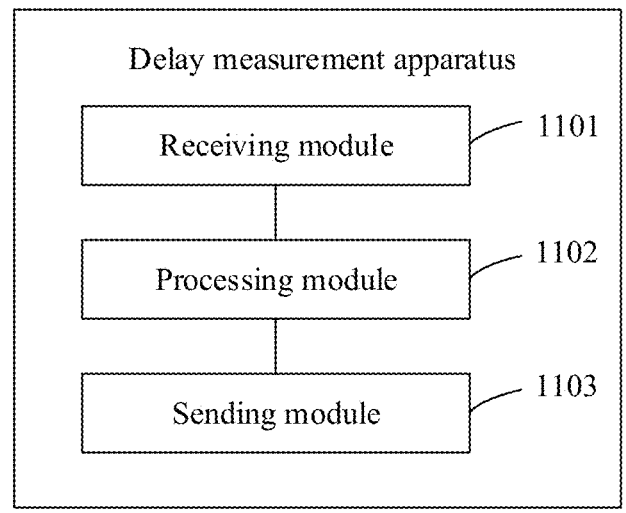
FIG. 11 is a schematic diagram of a structure of a delay statistical apparatus according to an embodiment of this application.

Refer to FIG. 11. An embodiment of this application provides a delay statistical apparatus. The apparatus includes a receiving module 1101 configured to obtain a first packet and a second packet, where the first packet and the second packet belong to a same measurement period, the first packet includes first flow detection information, the second packet includes second flow detection information, the first flow detection information includes a delay measurement flag, a first flag, and a second flag, the first flag of the first flow detection information is used to indicate a first sequence number of the first packet in the measurement period, and the second flag of the first flow detection information is used to indicate a total quantity of packets having delay measurement flags in the measurement period, the second flow detection information includes a delay measurement flag, a first flag, and a second flag, the first flag of the second flow detection information is used to indicate a second sequence number of the second packet in the measurement period, and the second flag of the second flow detection information is used to indicate a total quantity of packets having delay measurement flags in the measurement period, a processing module 1102 configured to obtain a first delay parameter of the first packet based on the first flow detection information, and obtain a second delay parameter of the second packet based on the second flow detection information, and a sending module 1103 configured to send the first delay parameter and the second delay parameter to a statistical apparatus.

In an example embodiment, the first flow detection information is located in an iFIT header of the first packet, the iFIT header of the first packet includes an FII, an FIH, and an FIEH. A reserved field of the FIEH is used to carry the first flag and the second flag of the first flow detection information.

The second flow detection information is located in an iFIT header of the second packet, the iFIT header of the second packet includes an FII, an FIH, and an FIEH. A reserved field of the FIEH is used to carry the first flag and the second flag of the second flow detection information.

In an example embodiment, the first packet and the second packet are discontinuous packets in different time periods in the same measurement period.

In an example embodiment, the first delay parameter includes timestamp information of the first packet, and the second delay parameter includes timestamp information of the second packet.

In an example embodiment, the sending module 1103 is further configured to send, to the statistical apparatus, a flow identifier of a service flow in which the first packet is located and information about an interface for transmission of the first packet, and send, to the statistical apparatus, a flow identifier of a service flow in which the second packet is located and information about an interface for transmission of the second packet.

In an example embodiment, the sending module 1103 is configured to send, to the statistical apparatus, a delay parameter of a packet that belongs to the measurement period, has a delay measurement flag and is among packets obtained in the measurement period, where the packet that belongs to the measurement period and has the delay measurement flag includes the first packet and the second packet.

In an example embodiment, the sending module 1103 is configured to send, to the statistical apparatus, a delay parameter of a packet that belongs to the measurement period, has a delay measurement flag and is among packets obtained in the measurement period and packets obtained within reference time after end of the measurement period, where the packet that belongs to the measurement period and has the delay measurement flag includes the first packet and the second packet.

In an example embodiment, the first flow detection information of the first packet further includes a third flag, used to indicate the measurement period in which the first packet is located.

The second flow detection information of the second packet further includes a third flag, used to indicate the measurement period in which the second packet is located.

Figure 12:
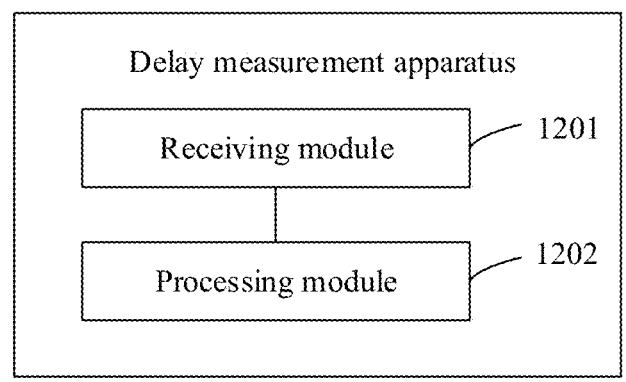
FIG. 12 is a schematic diagram of a structure of a delay statistical apparatus according to an embodiment of this application.

Refer to FIG. 12. An embodiment of this application further provides a delay statistical apparatus. The apparatus includes a receiving module 1201 configured to receive a first delay parameter of a first packet and a second delay parameter of a second packet, where the first packet and the second packet belong to a same measurement period, the first packet includes first flow detection information, the second packet includes second flow detection information, the first flow detection information includes a delay measurement flag, a first flag, and a second flag, the first flag of the first flow detection information is used to indicate a first sequence number of the first packet in the measurement period, and the second flag of the first flow detection information is used to indicate a total quantity of packets having delay measurement flags in the measurement period, the second flow detection information includes a delay measurement flag, a first flag, and a second flag, the first flag of the second flow detection information is used to indicate a second sequence number of the second packet in the measurement period, and the second flag of the second flow detection information is used to indicate a total quantity of packets having delay measurement flags in the measurement period, and a processing module 1202 configured to perform delay statistics based on the first delay parameter and the second delay parameter.

In an example embodiment, the first delay parameter includes timestamp information of the first packet, and the second delay parameter includes timestamp information of the second packet.

In an example embodiment, the receiving module 1201 is further configured to receive a flow identifier of a service flow in which the first packet is located and information about an interface for transmission of the first packet, and receive a flow identifier of a service flow in which the second packet is located and information about an interface for transmission of the second packet.

In an example embodiment, the processing module 1202 is configured to perform delay statistics of the first packet in a target direction based on the first delay parameter, perform delay statistics of the second packet in the target direction based on the second delay parameter, average the delay data of the first packet in the target direction and the delay data of the second packet in the target direction, and use an average result as delay data of the service flow in the target direction.

It should be understood that, when the apparatus provided in FIG. 11 or FIG. 12 implements functions of the apparatus, division into the foregoing functional modules is merely used as an example for description. In actual application, the foregoing functions may be allocated to different functional modules for implementation based on a requirement. In other words, an inner structure of a device is divided into different functional modules, to implement all or some of the functions described above. In addition, the apparatus in the foregoing embodiment and the method embodiments are based on a same concept. For a specific implementation process, refer to the method embodiments, and details are not described herein again.

Figure 13:
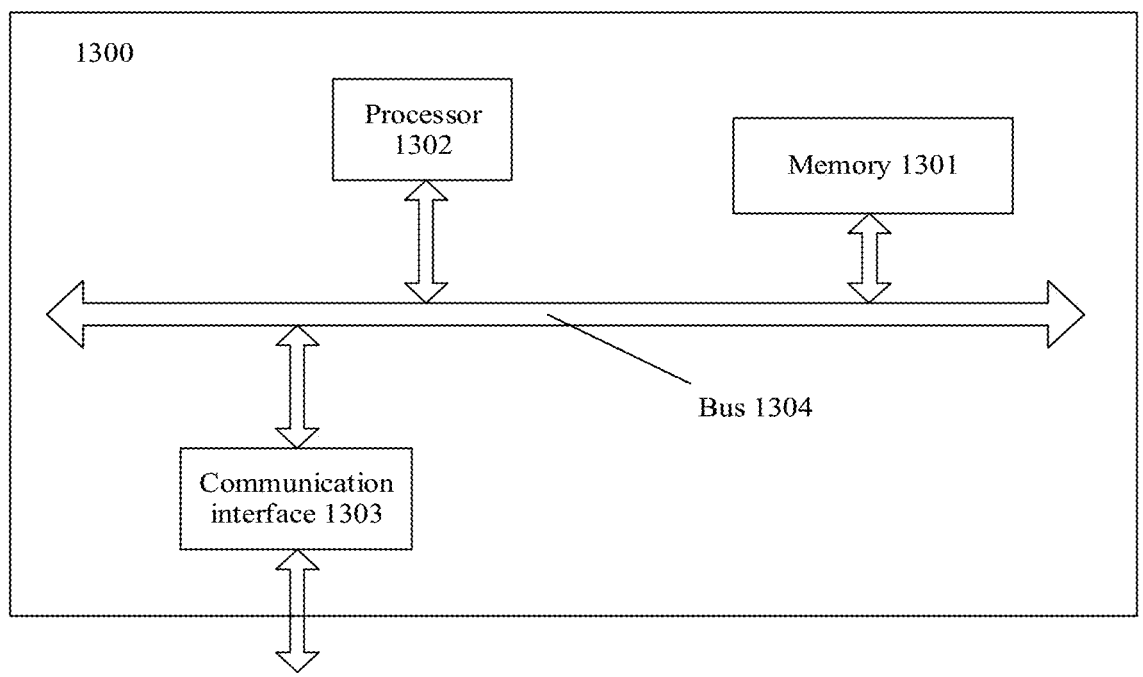
FIG. 13 is a schematic diagram of a structure of a delay statistical apparatus according to an embodiment of this application.

Refer to FIG. 13. An embodiment of this application further provides a delay statistical apparatus 1300. The delay statistical apparatus 1300 shown in FIG. 13 is configured to perform operations related to the foregoing delay statistical method. The delay statistical apparatus 1300 includes a memory 1301, a processor 1302, and a communication interface 1303. The memory 1301, the processor 1302, and the communication interface 1303 are connected by using a bus 1304.

The memory 1301 stores at least one instruction, and the at least one instruction is loaded and executed by the processor 1302, to implement any one of the foregoing delay statistical methods.

The communication interface 1303 is configured to communicate with another device in a network. The communication interface 1303 may be implemented in a wireless or wired manner. For example, the communication interface 1303 may be a network adapter. For example, the delay statistical apparatus 1300 may communicate with a node device by using the communication interface 1303, to receive a delay parameter, a flow identifier, interface information, and the like that are reported by the node device.

In an example embodiment, the communication interface 1303 is configured to obtain a first packet and a second packet. For content of the first packet and the second packet, refer to the foregoing description in the embodiment. Details are not described herein again.

The processor 1302 is configured to obtain a first delay parameter of the first packet based on the first flow detection information, and obtain a second delay parameter of the second packet based on the second flow detection information.

The communication interface 1303 is further configured to send the first delay parameter and the second delay parameter to a statistical apparatus.

In an example embodiment, the communication interface 1303 is further configured to send, to the statistical apparatus, a flow identifier of a service flow in which the first packet is located and information about an interface for transmission of the first packet, and send, to the statistical apparatus, a flow identifier of a service flow in which the second packet is located and information about an interface for transmission of the second packet.

In an example embodiment, the communication interface 1303 is configured to send, to the statistical apparatus, a delay parameter of a packet that belongs to the measurement period, has a delay measurement flag and is among packets obtained in the measurement period, where the packet that belongs to the measurement period and has the delay measurement flag includes the first packet and the second packet.

In an example embodiment, the communication interface 1303 is configured to report, to the statistical apparatus, a delay parameter of a packet that belongs to the measurement period, has a delay measurement flag and is among packets obtained in the measurement period and packets obtained within reference time after end of the measurement period, where the packet that belongs to the measurement period and has the delay measurement flag includes the first packet and the second packet.

In an example embodiment, if a delay statistical apparatus is used as a statistical apparatus, the communication interface 1303 is configured to receive the first delay parameter of the first packet and the second delay parameter of the second packet.

The processor 1302 is configured to perform delay statistics based on the first delay parameter and the second delay parameter.

In an example embodiment, the communication interface 1303 is further configured to receive a flow identifier of a service flow in which the first packet is located and information about an interface for transmission of the first packet, and receive a flow identifier of a service flow in which the second packet is located and information about an interface for transmission of the second packet.

In an example embodiment, the processing module 1302 is configured to perform delay statistics of the first packet in a target direction based on the first delay parameter, perform delay statistics of the second packet in the target direction based on the second delay parameter, average the delay data of the first packet in the target direction and the delay data of the second packet in the target direction, and use an average result as delay data of the service flow in the target direction.

In addition, it should be understood that FIG. 13 shows only a simplified design of the delay statistical apparatus 1300. In actual application, the delay statistical apparatus 1300 may include any quantity of communication interfaces, processors, or memories. In addition, the processor may be a central processing unit (CPU), or may be another general-purpose processor, a digital signal processor (DSP), an application-specific integrated circuit (ASIC), a field-programmable gate array (FPGA), or another programmable logic device, a discrete gate or transistor logic device, a discrete hardware component, or the like. The general-purpose processor may be a microprocessor, any conventional processor, or the like. It should be noted that the processor may be a processor that supports an advanced reduced instruction set computing (RISC) machines (ARM) architecture.

Further, in an optional embodiment, the memory may include a ROM and a random-access memory (RAM), and provide instructions and data for the processor. The memory may further include a nonvolatile RAM. For example, the memory may further store information about a device type.

The memory may be a volatile memory or a nonvolatile memory, or may include both a volatile memory and a nonvolatile memory. The nonvolatile memory may be a ROM, a programmable ROM (PROM), an erasable PROM (EPROM), an electrically EPROM (EEPROM), or a flash memory. The volatile memory may be a RAM, used as an external cache. For example but not limitation, many forms of RAMs are available, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct rambus (DR) RAM.

A computer-readable storage medium is further provided. The storage medium stores at least one instruction, and a processor loads and executes the instruction to implement any one of the foregoing delay statistical methods.

This application provides a computer program. When the computer program is executed by a computer, a processor or the computer may be enabled to perform corresponding operations and/or procedures in the foregoing method embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to this application are all or partially generated. The computer may be a general-purpose computer, a dedicated computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DIGITAL VERSATILE DISC (DVD)), a semiconductor medium (for example, a solid-state drive), or the like.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A delay statistical method comprising:
obtaining a first packet and a second packet that belong to a measurement period, wherein the first packet comprises a first in-situ flow information measurement (iFIT) header including first flow detection information, the first flow detection information in the first iFIT header comprising a first delay measurement flag, a first flag indicating a first sequence number of the first packet in the measurement period, and a second flag indicating a total quantity of packets having delay measurement flags in the measurement period, wherein the second packet comprises a second iFIT header including second flow detection information, the second flow detection information in the second iFIT header comprising a second delay measurement flag, a third flag indicating a second sequence number of the second packet in the measurement period, and a fourth flag indicating the total quantity of packets, wherein the first iFIT header comprises a first flow instruction indicator (FII), a first flow instruction header (FIH), and a first flow instruction extension header (FIEH), wherein a first reserved field of the first FIEH carries the first flag and the second flag, wherein the second iFIT header comprises a second FII, a second FIH, and a second FIEH, and wherein a second reserved field of the second FIEH carries the third flag and the fourth flag;
obtaining a first delay parameter of the first packet based on the first flow detection information in the first iFIT header;
obtaining a second delay parameter of the second packet based on the second flow detection information in the second iFIT header; and
sending the first delay parameter and the second delay parameter to a statistical apparatus.

2. The delay statistical method of claim 1, wherein the first packet and the second packet are discontinuous packets in different time periods of the measurement period.

3. The delay statistical method of claim 1, wherein the first delay parameter comprises first timestamp information of the first packet, and wherein the second delay parameter comprises second timestamp information of the second packet.

4. The delay statistical method of claim 1, further comprising:
sending, to the statistical apparatus, a first flow identifier of a first service flow in which the first packet is located and first information about a first interface for transmission of the first packet; and
sending, to the statistical apparatus, a second flow identifier of a second service flow in which the second packet is located and second information about a second interface for transmission of the second packet.

5. The delay statistical method of claim 1, wherein the first flow detection information further comprises a fifth flag indicating the measurement period, and wherein the second flow detection information further comprises a sixth flag indicating the measurement period.

6. The delay statistical method of claim 1, further comprising sending, to the statistical apparatus, a third delay parameter of a third packet that belongs to the measurement period, has a third delay measurement flag, and is obtained within an extended measurement time that is a reference time after an end of the measurement period.

7. A delay statistical apparatus comprising:
a communication interface configured to obtain a first packet and a second packet belonging to a measurement period, wherein the first packet comprises a first in-situ flow information measurement (iFIT) header including first flow detection information, the first flow detection information in the first iFIT header comprising a first delay measurement flag, a first flag indicating a first sequence number of the first packet in the measurement period, and a second flag indicating a total quantity of packets having delay measurement flags in the measurement period, wherein the second packet comprises a second iFIT header including second flow detection information, the second flow detection information in the second iFIT header comprising a second delay measurement flag, a third flag indicating a second sequence number of the second packet in the measurement period, and a fourth flag indicating the total quantity of packets, wherein the first iFIT header comprises a first flow instruction indicator (FII), a first flow instruction header (FIH), and a first flow instruction extension header (FIEH), wherein a first reserved field of the first FIEH carries the first flag and the second flag, wherein the second iFIT header comprises a second FII, a second FIH, and a second FIEH, and wherein a second reserved field of the second FIEH carries the third flag and the fourth flag; and
a processor coupled to the communication interface and configured to:
obtain a first delay parameter of the first packet based on the first flow detection information in the first iFIT header, and
obtain a second delay parameter of the second packet based on the second flow detection information in the second iFIT header;
wherein the communication interface is further configured to send the first delay parameter and the second delay parameter to a statistical apparatus.

8. The delay statistical apparatus of claim 7, wherein the first packet and the second packet are discontinuous packets in different time periods of the measurement period.

9. The delay statistical apparatus of claim 7, wherein the first delay parameter comprises first timestamp information of the first packet, and wherein the second delay parameter comprises second timestamp information of the second packet.

10. The delay statistical apparatus of claim 7, wherein the communication interface is further configured to:
send, to the statistical apparatus, a first flow identifier of a first service flow in which the first packet is located and first information about a first interface for transmission of the first packet; and
send, to the statistical apparatus, a second flow identifier of a second service flow in which the second packet is located and second information about a second interface for transmission of the second packet.

11. The delay statistical apparatus of claim 7, wherein the first flow detection information further comprises a fifth flag indicating the measurement period, and wherein the second flow detection information further comprises a sixth flag indicating the measurement period.

12. The delay statistical apparatus of claim 7, wherein the communication interface is further configured to report, to the statistical apparatus, a third delay parameter of a third packet that belongs to the measurement period, has a third delay measurement flag, and is obtained within an extended measurement time that is a reference time after an end of the measurement period.

13. A non-transitory computer-readable storage medium storing one or more programs configured to be executed by one or more processors of a network element, the one or more programs including instructions for:
obtaining a first packet and a second packet that belong to a measurement period, wherein the first packet comprises a first in-situ flow information measurement (iFIT) header including first flow detection information, the first flow detection information in the first iFIT header comprising a first delay measurement flag, a first flag indicating a first sequence number of the first packet in the measurement period, and a second flag indicating a total quantity of packets having delay measurement flags in the measurement period, wherein the second packet comprises a second iFIT header including second flow detection information, the second flow detection information in the second iFIT header comprising a second delay measurement flag, a third flag indicating a second sequence number of the second packet in the measurement period, and a fourth flag indicating the total quantity of packets, wherein the first iFIT header comprises a first flow instruction indicator (FII), a first flow instruction header (FIR), and a first flow instruction extension header (FIEH), wherein a first reserved field of the first FIEH carries the first flag and the second flag, wherein the second iFIT header comprises a second FII, a second FIH, and a second FIEH, and wherein a second reserved field of the second FIEH carries the third flag and the fourth flag;
obtaining a first delay parameter of the first packet based on the first flow detection information in the first iFIT header;
obtaining a second delay parameter of the second packet based on the second flow detection information in the second iFIT header; and
sending the first delay parameter and the second delay parameter to a statistical apparatus.

14. The non-transitory computer-readable storage medium of claim 13, wherein the first flow detection information further comprises a fifth flag indicating the measurement period, and wherein the second flow detection information further comprises a sixth flag indicating the measurement period.

15. The non-transitory computer-readable storage medium of claim 13, the one or more programs including instructions for:
sending, to the statistical apparatus, a third delay parameter of a third packet that belongs to the measurement period, has a third delay measurement flag, and is obtained within an extended measurement time that is a reference time after an end of the measurement period.

* * * * *